United States Patent
Yang et al.

(10) Patent No.: US 12,048,035 B2
(45) Date of Patent: Jul. 23, 2024

(54) ADDING AND RELEASING A SECONDARY CELL IN A MULTI-CELL CONNECTIVITY CONFIGURATION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/214,405

(22) Filed: Mar. 26, 2021

(65) Prior Publication Data

US 2021/0337612 A1  Oct. 28, 2021

Related U.S. Application Data

(60) Provisional application No. 63/016,687, filed on Apr. 28, 2020.

(51) Int. Cl.
*H04W 76/15* (2018.01)
*H04W 24/10* (2009.01)
(Continued)

(52) U.S. Cl.
CPC .......... *H04W 76/15* (2018.02); *H04W 24/10* (2013.01); *H04W 76/20* (2018.02); *H04W 76/30* (2018.02); *H04W 88/06* (2013.01)

(58) Field of Classification Search
CPC ..... H04W 76/15; H04W 24/10; H04W 76/20; H04W 76/30; H04W 88/06;
(Continued)

(56) References Cited

U.S. PATENT DOCUMENTS

| | | | | |
|---|---|---|---|---|
| 2012/0250578 A1* | 10/2012 | Pani | ...................... | H04W 48/12 370/254 |
| 2015/0043492 A1* | 2/2015 | Baek | ................. | H04W 56/0005 370/329 |

(Continued)

FOREIGN PATENT DOCUMENTS

| | | |
|---|---|---|
| CN | 104303577 A | 1/2015 |
| CN | 109315008 A | 2/2019 |
| EP | 3462801 A1 | 4/2019 |

OTHER PUBLICATIONS

"3rd Generation Partnership Project, Technical Specification Group Radio Access Network, Evolved Universal Terrestrial Radio Access (E-UTRA) and NR, Multi-Connectivity, Stage 2 (Release 16)", 3GPP Standard, Technical Specification, 3GPP TS 37.340, 3rd Generation Partnership Project (3GPP), Mobile Competence Centre, 650, Route Des Lucioles, F-06921, Sophia-Antipolis Cedex, France, vol. RAN WG2. No. V16.1.0, Apr. 7, 2020 (Apr. 7, 2020), XP051893890, pp. 1-74, Retrieved from the Internet: URL:ftp://ftp.3gpp.org/Specs/archive/37_series/37.340/37340-g10.zip 37340-g10.docx [retrieved on Apr. 7, 2020] pp. 8-10 pp. 16-18 pp. 24-28.

(Continued)

*Primary Examiner* — Will W Lin
(74) *Attorney, Agent, or Firm* — Arun Swain

(57) ABSTRACT

This disclosure provides systems, methods and apparatuses for adding and releasing secondary cells in a multi-cell connectivity configuration. In one aspect, a user equipment (UE) may transmit UE assistance information to a base station (BS) operating as a master cell in a multi-cell connectivity configuration. The UE assistance information may indicate a process that the BS is to use to add a secondary cell to the multi-cell connectivity configuration, may indicate a time gap for adding a secondary cell after another secondary cell is released from the multi-cell connectivity configuration, as well as other multi-cell connec- (Continued)

tivity configuration information. The BS may receive the UE assistance information and may add a secondary cell to the multi-cell connectivity configuration based at least in part on the indicated process and time gap.

30 Claims, 7 Drawing Sheets

(51) Int. Cl.
   *H04W 76/20*     (2018.01)
   *H04W 76/30*     (2018.01)
   *H04W 88/06*     (2009.01)

(58) Field of Classification Search
   CPC . H04W 36/0085; H04W 76/34; H04W 76/16; H04L 5/0032; H04L 5/0098; H04L 5/001; H04L 5/0026
   See application file for complete search history.

(56) References Cited

U.S. PATENT DOCUMENTS

| | | | |
|---|---|---|---|
| 2016/0219475 A1* | 7/2016 | Kim | H04W 76/15 |
| 2016/0227416 A1* | 8/2016 | Suzuki | H04W 72/1215 |
| 2017/0171768 A1 | 6/2017 | Kim et al. | |
| 2018/0359790 A1* | 12/2018 | Ingale | H04W 74/08 |
| 2019/0075585 A1* | 3/2019 | Deogun | H04W 72/1273 |
| 2019/0159049 A1* | 5/2019 | Kim | H04B 7/0417 |
| 2021/0211953 A1* | 7/2021 | Tsai | H04W 36/0094 |
| 2022/0078801 A1* | 3/2022 | Huang | H04W 76/15 |
| 2022/0150741 A1* | 5/2022 | Teyeb | H04W 76/27 |
| 2022/0167448 A1* | 5/2022 | Palle | H04W 76/30 |
| 2022/0182951 A1* | 6/2022 | Zhou | H04W 4/06 |
| 2022/0191779 A1* | 6/2022 | Bergqvist | H04W 76/15 |
| 2022/0286887 A1* | 9/2022 | Zheng | H04W 24/10 |
| 2022/0338227 A1* | 10/2022 | Cirik | H04W 72/53 |

OTHER PUBLICATIONS

International Search Report and Written Opinion—PCT/US2021/070326—ISA/EPO—dated Aug. 17, 2021.
Partial International Search Report—PCT/US2021/070326—ISA/EPO—dated Jun. 25, 2021.
Mediatek Inc: "Conditional PSCell addition", 3GPP TSG-RAN WG2 #106, R2-1906082, Reno, Nevada, USA, May 13-17, 2019, 3 Pages.

* cited by examiner

ADDING AND RELEASING A SECONDARY CELL IN A MULTI-CELL CONNECTIVITY CONFIGURATION

CROSS-REFERENCE TO RELATED APPLICATION

This Patent application claims priority to U.S. Provisional Patent Application No. 63/016,687, filed on Apr. 28, 2020, entitled "ADDING AND RELEASING A SECONDARY CELL IN A MULTI-CELL CONNECTIVITY CONFIGURATION," and assigned to the assignee hereof. The disclosure of the prior Application is considered part of and is incorporated by reference into this Patent Application.

TECHNICAL FIELD

Aspects of the present disclosure relate generally to wireless communication and to techniques for adding and releasing a secondary cell in a multi-cell connectivity configuration.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink (DL) and uplink (UL). The "downlink" (or "forward link") refers to the communication link from the BS to the UE, and the "uplink" (or "reverse link") refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include transmitting, to a master cell associated with the UE, an indication to add a secondary cell to a multi-cell connectivity configuration with the master cell. The method may include receiving, from the master cell, one or more communications to add the secondary cell.

In some aspects, receiving the one or more communications to add the secondary cell includes receiving a first communication to release a measurement gap associated with the master cell. In some aspects, receiving the one or more communications to add the secondary cell includes receiving a second communication to add the secondary cell after receiving the first communication. In some aspects, receiving the one or more communications to add the secondary cell includes receiving a single communication to release a measurement gap associated with the master cell and add the secondary cell. In some aspects, transmitting the indication includes transmitting the indication in at least one of a measurement report, including both normal and early measurement reporting, or a secondary cell group releasing complete communication. In some aspects, transmitting the indication includes transmitting the indication in at least one of a radio resource control (RRC) setup request communication or an RRC setup complete communication. In some aspects, transmitting the indication includes transmitting the indication in at least one of an RRC resume request communication or an RRC resume complete. In some aspects, obtaining the one or more communications to add the secondary cell includes obtaining the one or more communications to add the secondary cell based at least in part on the indication.

Another innovative aspect of the subject matter described in this disclosure can be implemented in a method of wireless communication performed by an apparatus of a UE. The method may include transmitting, to a master cell associated with the UE and after release of a first secondary cell from a multi-cell connectivity configuration, an indication of a time gap for adding a second secondary cell to the multi-cell connectivity configuration with the master cell. The method may include receiving, from the master cell and after the time gap, an indication to add the second secondary cell after release of the first secondary cell.

In some aspects, transmitting the indication of the time gap includes transmitting the indication in a communication associated with the first secondary cell being added to the multi-cell connectivity configuration.

Another innovative aspect of the subject matter described in this disclosure can be implemented in a method of wireless communication performed by an apparatus of a base station (BS). The method may include obtaining an indication to add a secondary cell to a multi-cell connectivity configuration. The BS may be a master cell in the multi-cell connectivity configuration. The method may include outputting one or more communications to add the secondary cell.

In some aspects, outputting the one or more communications to add the secondary cell includes outputting a first communication to release a measurement gap associated with the master cell. In some aspects, outputting the one or more communications to add the secondary cell includes outputting, after outputting the first communication, a second communication to add the secondary cell. In some aspects, outputting the one or more communications to add the secondary cell includes outputting a single communication to release a measurement gap associated with the master cell and add the secondary cell. In some aspects, obtaining the indication includes obtaining the indication in at least one of a measurement report or a secondary cell group releasing complete communication. In some aspects, obtaining the indication includes obtaining the indication in at least one of an RRC setup request communication or an RRC setup complete communication. In some aspects, obtaining the indication includes obtaining the indication in at least one of an RRC resume request communication or an RRC resume complete. In some aspects, outputting the one or more communications to add the secondary cell includes outputting the one or more communications to add the secondary cell based at least in part on the indication.

Another innovative aspect of the subject matter described in this disclosure can be implemented in a method of wireless communication performed by an apparatus of a BS. The method may include obtaining, after release of a first secondary cell from a multi-cell connectivity configuration, an indication of a time gap for configuring secondary cell measurement and a measurement gap, and for adding a second secondary cell to the multi-cell connectivity configuration in which the BS is a master cell. The method may include outputting, after the time gap, an indication to add the second secondary cell.

In some aspects, obtaining the indication of the time gap includes obtaining the indication in a communication associated with the first secondary cell being released from the multi-cell connectivity configuration.

Another innovative aspect of the subject matter described in this disclosure can be implemented in a UE for wireless communication. The UE may include a first interface configured to output an indication for transmission to a master cell to add a secondary cell to a multi-cell connectivity configuration with the master cell. The UE may include the first interface or a second interface configured to obtain, from the master cell, one or more communications to add the secondary cell. In some aspects, the UE may perform or implement any one or more of the aspects described in connection with the method above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to output an indication for transmission to a master cell to add a secondary cell to a multi-cell connectivity configuration with the master cell. The one or more instructions, when executed by one or more processors of the UE, may cause the one or more processors to obtain, from the master cell, one or more communications to add the secondary cell. In some aspects, the one or more instructions, when executed by one or more processors of the UE, may cause the one or more processors to perform or implement any one or more of the aspects described in connection with the method above or elsewhere herein.

Another innovative aspect of the subject matter described in this disclosure can be implemented in an apparatus for wireless communication. The apparatus may include means for obtaining an indication for transmission to a master cell to add a secondary cell to a multi-cell connectivity configuration with the master cell. The apparatus may include means for obtaining, from the master cell, one or more communications to add the secondary cell. In some aspects, the apparatus may perform or implement any one or more of the aspects described in connection with the method above or elsewhere herein.

Another innovative aspect of the subject matter described in this disclosure can be implemented in a UE for wireless communication. The UE may include a first interface configured to output, after release of a first secondary cell from a multi-cell connectivity configuration, an indication for transmission to a master cell of a time gap for adding a second secondary cell to the multi-cell connectivity configuration with the master cell. The UE may include the first interface or a second interface configured to output, from the master cell and after the time gap, an indication to add the second secondary cell after release of the first secondary cell. In some aspects, the UE may perform or implement any one or more of the aspects described in connection with the method above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to output, after release of a first secondary cell from a multi-cell connectivity configuration, an indication for transmission to a master cell of a time gap for adding a second secondary cell to the multi-cell connectivity configuration with the master cell. The one or more instructions, when executed by one or more processors of the UE, may cause the one or more processors to obtain, from the master cell and after the time gap, an indication to add the second secondary cell after release of the first secondary cell. In some aspects, the one or more instructions, when executed by one or more processors of the UE, may cause the one or more processors to perform or implement any one or more of the aspects described in connection with the method above or elsewhere herein.

Another innovative aspect of the subject matter described in this disclosure can be implemented in an apparatus for wireless communication. The apparatus may include means for outputting, after release of a first secondary cell from a multi-cell connectivity configuration, an indication for transmission to a master cell of a time gap for adding a second secondary cell to the multi-cell connectivity configuration with the master cell. The apparatus may include means for obtaining, from the master cell and after the time gap, an indication to add the second secondary cell after release of the first secondary cell. In some aspects, the apparatus may perform or implement any one or more of the aspects described in connection with the method above or elsewhere herein.

Another innovative aspect of the subject matter described in this disclosure can be implemented in a BS for wireless communication. The BS may include a first interface configured to obtain an indication to add a secondary cell to a multi-cell connectivity configuration. The BS may be a master cell in the multi-cell connectivity configuration. The BS may include a first interface or a second interface configured to output one or more communications to add the secondary cell. In some aspects, the BS may perform or implement any one or more of the aspects described in connection with the method above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to obtain an indication to add a secondary cell to a multi-cell connectivity configuration. The BS may be a master cell in the multi-cell connectivity configuration. The one or more instructions, when executed by one or more processors of the BS, may cause the one or more processors to output one or more communications to add the secondary cell. In some aspects, the one or more instructions, when executed by one or more processors of the BS, may cause the one or more processors to perform or implement any one or more of the aspects described in connection with the method above or elsewhere herein.

Another innovative aspect of the subject matter described in this disclosure can be implemented in an apparatus for wireless communication. The apparatus may include means for obtaining an indication to add a secondary cell to a multi-cell connectivity configuration associated with the UE. The apparatus may be a master cell in the multi-cell connectivity configuration. The apparatus may include means for outputting one or more communications to add the secondary cell. In some aspects, the apparatus may perform or implement any one or more of the aspects described in connection with the method above or elsewhere herein.

Another innovative aspect of the subject matter described in this disclosure can be implemented in a BS for wireless communication. The BS may include a first interface configured to obtain, after release of a first secondary cell from a multi-cell connectivity configuration, an indication of a time gap for configuring secondary cell measurement and a measurement gap, and for adding a second secondary cell to the multi-cell connectivity configuration in which the BS is a master cell. The BS may include the first interface or a second interface configured to output, after the time gap, an indication to configure secondary cell measurement and the measurement gap, and to add the second secondary cell. In some aspects, the BS may perform or implement any one or more of the aspects described in connection with the method above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to obtain, after release of a first secondary cell from a multi-cell connectivity configuration, an indication of a time gap for configuring secondary cell measurement and a measurement gap, and for adding a second secondary cell to the multi-cell connectivity configuration in which the BS is a master cell. The one or more instructions, when executed by one or more processors of the BS, may cause the one or more processors to output, after the time gap, an indication to configure secondary cell measurement and the time measurement gap, and to add the second secondary cell. In some aspects, the one or more instructions, when executed by one or more processors of the BS, may cause the one or more processors to perform or implement any one or more of the aspects described in connection with the method above or elsewhere herein.

Another innovative aspect of the subject matter described in this disclosure can be implemented in an apparatus for wireless communication. The apparatus may include means for obtaining, after release of a first secondary cell from a multi-cell connectivity configuration, an indication of a time gap for configuring secondary cell measurement and a measurement gap, and for adding a second secondary cell to the multi-cell connectivity configuration in which the apparatus is a master cell. The apparatus may include means for outputting, after the time gap, an indication to configure secondary cell measurement and the measurement gap, and to add the second secondary cell. In some aspects, the apparatus may perform or implement any one or more of the aspects described in connection with the method above or elsewhere herein.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
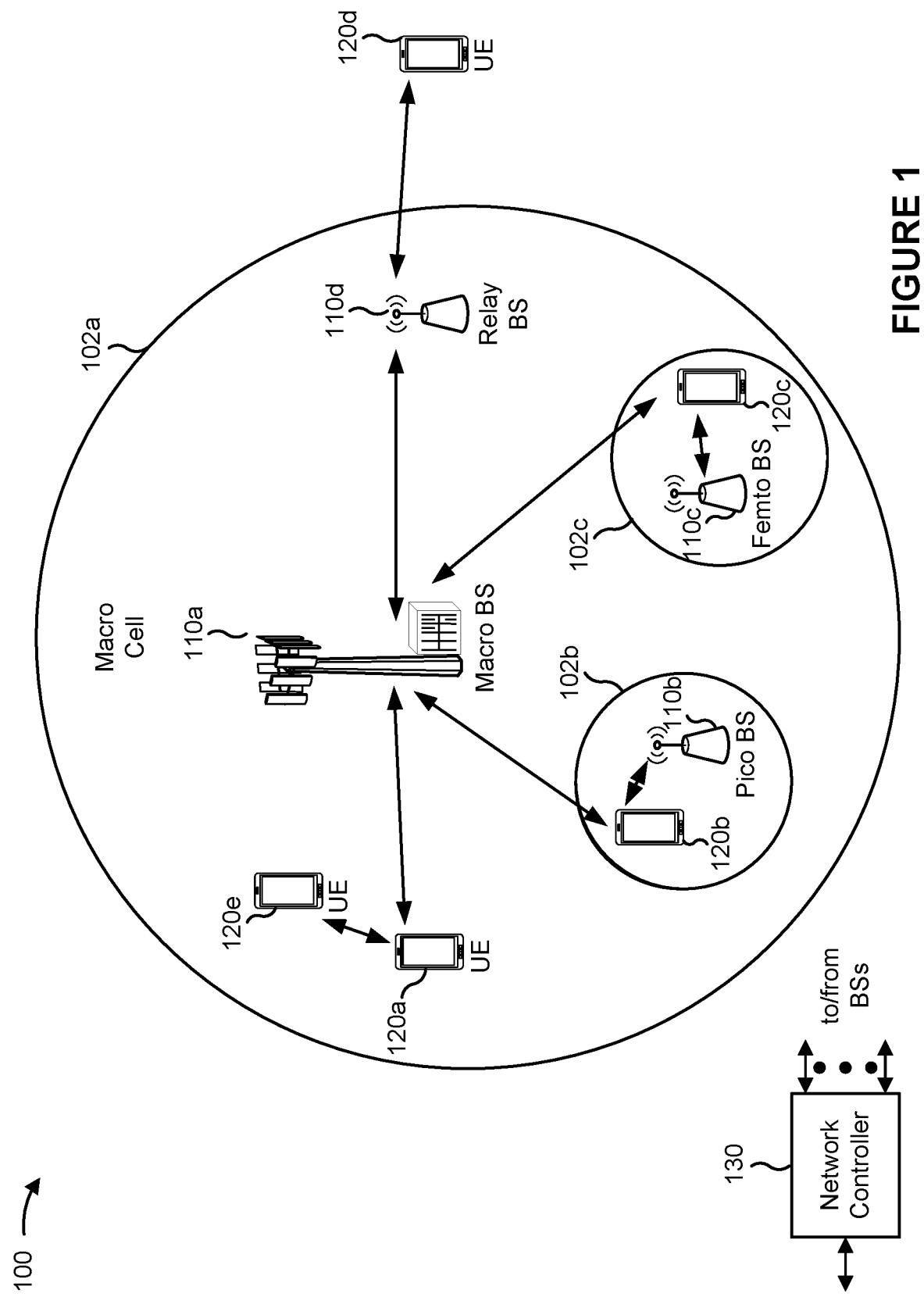
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A wireless network may be configured to support various types of radio access technologies (RATs), such as an LTE RAT, a 5G New Radio (5G NR) RAT, as well as other types of RATs. In some cases, a wireless network may be configured to support multi-cell connectivity for a user equipment (UE). In these cases, if the UE is capable, the UE may be communicatively connected with two or more cells of the wireless network simultaneously. Multi-cell connectivity may facilitate the use of various types of multi-RAT deployment configurations in the wireless network. For example, multi-cell connectivity may permit a non-standalone (NSA) deployment, in which an LTE cell may be configured as a master cell (or primary cell, PCell) for a UE and a 5G NR cell may be configured as a secondary cell (SCell) for the UE. The LTE cell and the 5G NR cell may be supported by an LTE core network (for example, an evolved packet core (EPC)). Accordingly, the non-standalone deployment permits the UE to take advantage of the high throughput and low latency of the 5G NR cell while control plane communication between the UE and the LTE core network is handled via the LTE cell.

A master cell may perform various processes to add and release secondary cells in a multi-cell connectivity configuration associated with a UE. For example, the master cell may configure a communication gap during which the UE is to temporarily cease communication with the master cell to perform secondary cell measurements for one or more candidate secondary cells. The UE may transmit a measurement report to the master cell, which may identify a secondary cell to be added to the multi-cell connectivity configuration.

Once the secondary cell to be added is identified, the master cell may instruct the UE to release the secondary cell measurements and the communication gap, and may add the secondary cell. In a first process, the master cell may transmit a request to the secondary cell to be added to the multi-cell connectivity configuration and may transmit, to the UE and after receiving an acceptance from the secondary cell, an instruction to release the secondary cell measurements and communication gap and to add the secondary cell. In a second process, the master cell may transmit an instruction to release the secondary cell measurements and the communication gap to the UE, may transmit a request to the secondary cell to be added to the multi-cell connectivity configuration after transmitting the instruction to the UE, and may transmit another instruction to the UE to add the secondary cell after receiving an acceptance from the secondary cell.

Moreover, if a secondary cell is released from the multi-cell connectivity configuration, the master cell may quickly (or sometimes, immediately) identify and add another secondary cell, or may delay the addition of another secondary cell. However, some processes for adding and releasing secondary cells may be better suited for some UEs than other UEs, may be better suited for particular communication scenarios, or a combination thereof.

Some aspects described herein provide techniques and apparatuses for adding and releasing a secondary cell in a multi-cell connectivity configuration. In some aspects, a UE may transmit UE assistance information to a base station (BS) operating as a master cell in a multi-cell connectivity configuration. The UE assistance information may indicate a process that the BS is to use to add a secondary cell to the multi-cell connectivity configuration, may indicate a time gap for adding a secondary cell after another secondary cell is released from the multi-cell connectivity configuration, as well as other multi-cell connectivity configuration information.

Particular implementations of the subject matter described in this disclosure can be implemented to realize one or more of the following potential advantages. In some aspects, a BS operating as a master cell in a multi-cell connectivity configuration with a UE may receive UE assistance information from the UE and may identify a process, for adding a secondary cell to the multi-cell connectivity configuration, that is optimized for the UE's particular implementation, for the UE's battery consumption, or for the UE's traffic quality of service parameters, among other examples. This may increase throughput for the UE, may decrease communication latency for the UE, or may increase the battery life of the UE, among other examples. Moreover, the BS may receive the UE assistance information from the UE and may add a secondary cell to the multi-cell connectivity configuration after a time gap indicated by the UE assistance information. This may permit the BS to manage the addition of new secondary cells more effectively.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay BS 110d may communicate with macro BS 110a and a UE 120d in order to facilitate communication between BS 110a and UE 120d. A relay BS also may be referred to as a relay station, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, or mid-band frequencies (such as greater than 7.125 GHz). Similarly, unless specifically stated otherwise, it should be understood that the term "millimeter wave" or the like, if used herein, may broadly represent frequencies within the EHF band, frequencies within FR2, or mid-band frequencies (such as less than 24.25 GHz). It is contemplated that the frequencies included in FR1 and FR2 may be modified, and techniques described herein are applicable to those modified frequency ranges.

Figure 2:
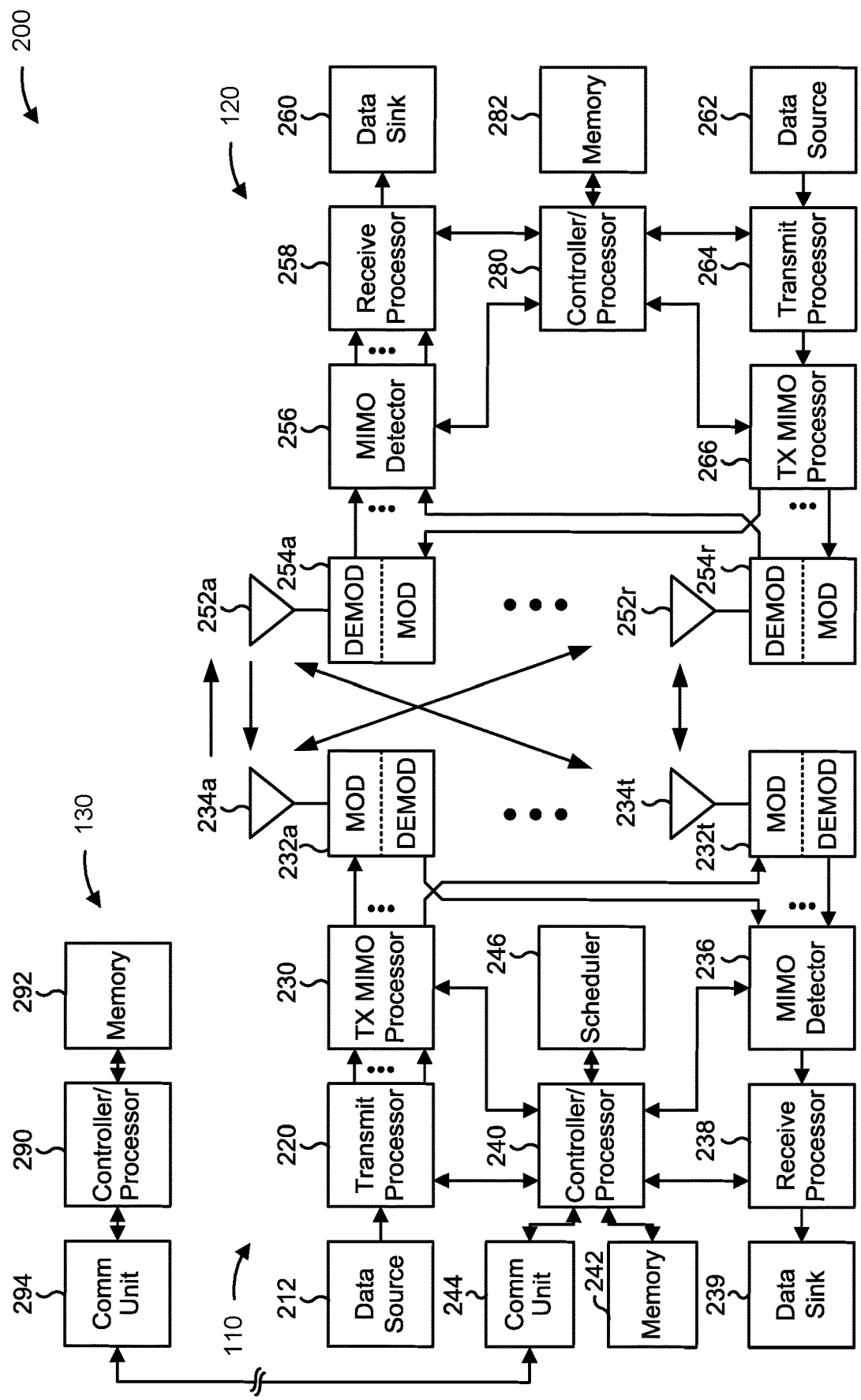
FIG. 2 is a diagram illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, a channel quality indicator (CQI) parameter, etc. In some aspects, one or more components of UE 120 may be included in a housing.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. In some aspects, a modulator and a demodulator (such as MOD/DEMOD 254) of the UE 120 may be included in a modem of the UE 120.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. In some aspects, a modulator and a demodulator (such as MOD/DEMOD 232) of the base station 110 may be included in a modem of the base station 110. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with adding and releasing a secondary cell in a multi-cell connectivity configuration, as described in more detail elsewhere herein. For example, the controller/processor 240 of base station 110, the controller/processor 280 of UE 120, or any other component(s) (or combinations of components) of FIG. 2 may perform or direct operations of, for example, process 300 of FIG. 3, process 400 of FIG. 4, process 500 of FIG. 5, process 600 of FIG. 6, or other processes as described herein. The memories 242 and 282 may store data and program codes for base station 110 and UE 120, respectively. A scheduler 246 may schedule UEs for data transmission on the downlink, the uplink, or a combination thereof.

Figure 3:
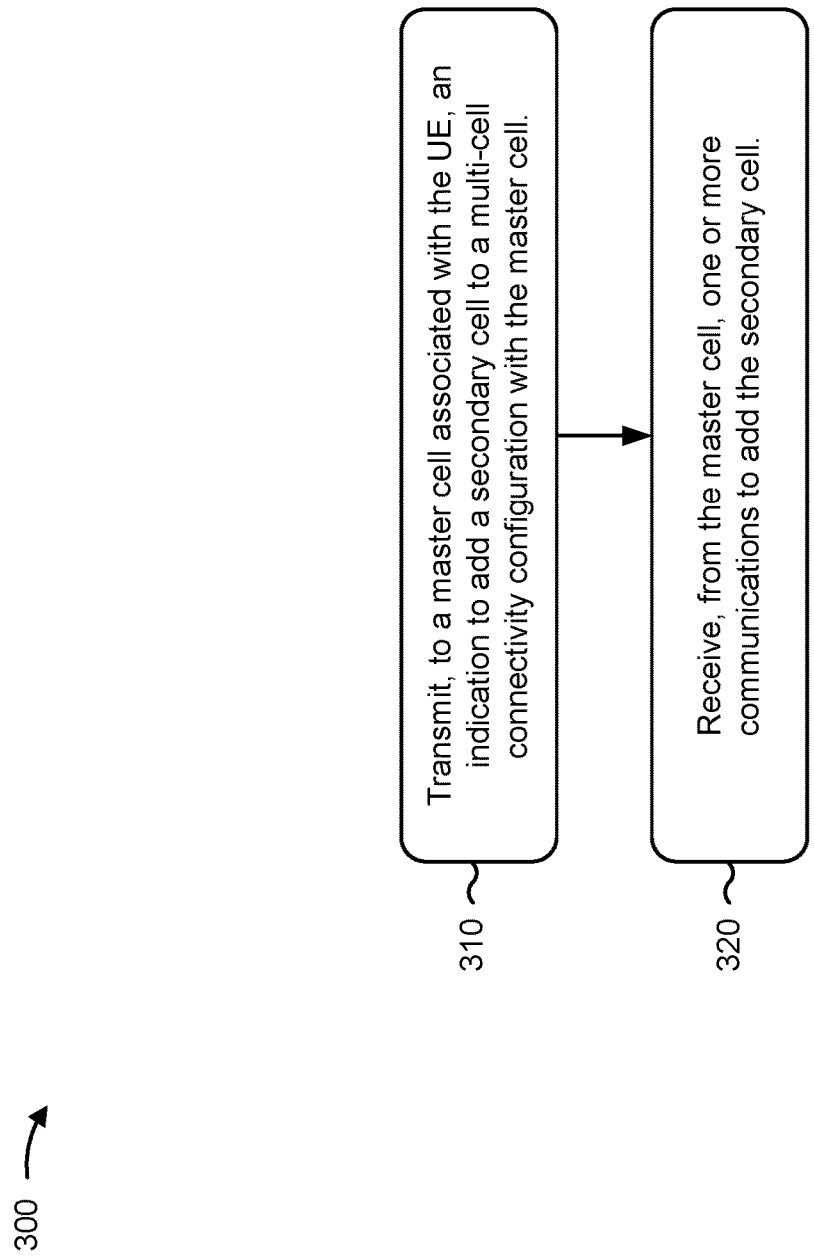
FIGS. 3 and 4 are diagrams illustrating example processes performed, for example, by a UE.
Figure 4:
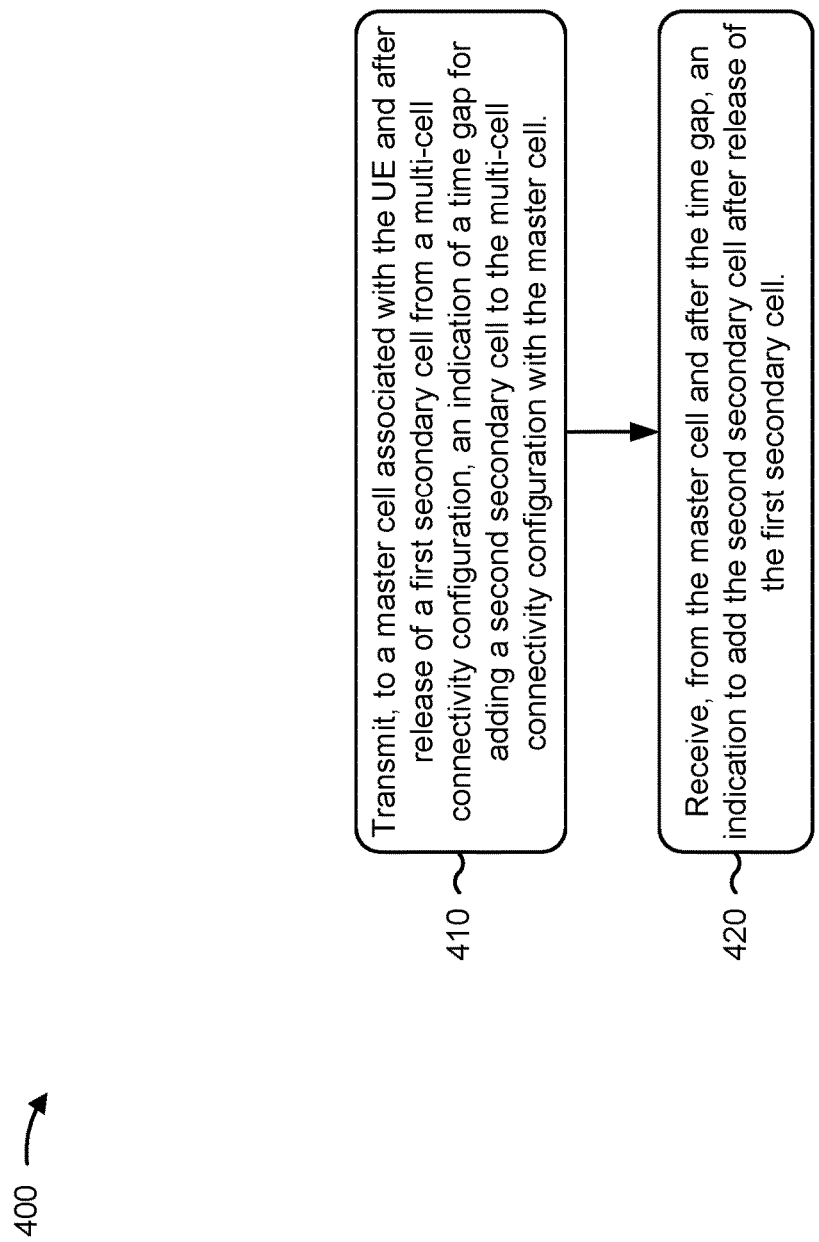

The stored program codes, when executed by the controller/processor 280 or other processors and modules at UE 120, may cause the UE 120 to perform operations described with respect to process 300 of FIG. 3, process 400 of FIG. 4, or other processes as described herein. The stored program codes, when executed by the controller/processor 240 or other processors and modules at base station 110, may cause the base station 110 to perform operations described with respect to process 500 of FIG. 5, process 600 of FIG. 6, or other processes as described herein. A scheduler 246 may schedule UEs for data transmission on the downlink, the uplink, or a combination thereof.

In some aspects, UE 120 may include means for outputting an indication for transmission to a master cell to add a secondary cell to a multi-cell connectivity configuration with the master cell, means for receiving, from the master cell, one or more communications to add the secondary cell, or the like, or combinations thereof. In some aspects, UE 120 may include means for outputting, to after release of a first secondary cell from a multi-cell connectivity configuration, an indication for transmission to a master cell of a time gap for adding a second secondary cell to the multi-cell connectivity configuration with the master cell, means for receiving, from the master cell and after the time gap, an indication to add the second secondary cell after release of the first secondary cell, or the like, or combinations thereof. In some aspects, such means may include one or more components of UE 120 described in connection with FIG. 2.

In some aspects, BS 110 may include means for obtaining an indication to add a secondary cell to a multi-cell connectivity configuration, where the BS 110 is a master cell in the multi-cell connectivity configuration, means for outputting one or more communications to add the secondary cell, or the like, or combinations thereof. In some aspects, BS 110 may include means for obtaining, after release of a first secondary cell from a multi-cell connectivity configuration, an indication of a time gap for adding a second secondary cell to the multi-cell connectivity configuration in which the BS 110 is a master cell, means for outputting, after the time gap, an indication to add the second secondary cell, or the like, or combinations thereof. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

FIG. 3 is a diagram illustrating an example process 300 performed, for example, by a UE, in accordance with various aspects of the present disclosure. The example process 300 shows where the UE (for example, UE 120) performs operations associated with adding and releasing a secondary cell in a multi-cell connectivity configuration.

As shown in FIG. 3, in some aspects, the process 300 may include transmitting, to a master cell associated with the UE, an indication to add a secondary cell to a multi-cell connectivity configuration with the master cell (block 310). For example, the UE (such as by using receive processor 258, transmit processor 264, controller/processor 280, memory 282, or a combination thereof) may transmit, to a master cell associated with the UE, an indication to add a secondary cell to a multi-cell connectivity configuration with the master cell.

As shown in FIG. 3, in some aspects, the process 300 may include receiving, from the master cell, one or more communications to add the secondary cell (block 320). For example, the UE (such as by using receive processor 258, transmit processor 264, controller/processor 280, memory 282, or a combination thereof) may receive, from the master cell, one or more communications to add the secondary cell.

The process 300 may include additional aspects, such as any single aspect or any combination of aspects described below or in connection with one or more other processes described elsewhere herein.

In a first aspect, receiving the one or more communications to add the secondary cell includes receiving a first communication to release a measurement gap associated with the master cell. In a second aspect, alone or in combination with the first aspect, receiving the one or more communications to add the secondary cell includes receiving a second communication to add the secondary cell after receiving the first communication. In a third aspect, alone or in combination with one or more of the first or second aspects, receiving the one or more communications to add the secondary cell includes receiving a single communication to release a measurement gap associated with the master cell and add the secondary cell.

In a fourth aspect, alone or in combination with one or more of the first through third aspects, transmitting the indication includes transmitting the indication in at least one of a measurement report including both normal and early measurement reporting, or a secondary cell group releasing complete communication. In a fifth aspect, alone or in combination with one or more of the first through fourth aspects, transmitting the indication includes transmitting the indication in at least one of a radio resource control (RRC) setup request communication or an RRC setup complete communication. In a sixth aspect, alone or in combination with one or more of the first through fifth aspects, transmitting the indication includes transmitting the indication in at least one of an RRC resume request communication or an RRC resume complete. In a seventh aspect, alone or in combination with one or more of the first through sixth aspects, obtaining the one or more communications to add the secondary cell includes obtaining the one or more communications to add the secondary cell based at least in part on the indication.

Although FIG. 3 shows example blocks of the process 300, in some aspects, the process 300 may include additional blocks, fewer blocks, different blocks, or differently arranged blocks than those depicted in FIG. 3. Additionally, or alternatively, two or more of the blocks of the process 300 may be performed in parallel.

FIG. 4 is a diagram illustrating an example process 400 performed, for example, by a UE, in accordance with various aspects of the present disclosure. The example process 400 shows where the UE (for example, UE 120) performs operations associated with adding and releasing a secondary cell in a multi-cell connectivity configuration.

As shown in FIG. 4, in some aspects, the process 400 may include transmitting, to a master cell associated with the UE and after release of a first secondary cell from a multi-cell connectivity configuration, an indication of a time gap for adding a second secondary cell to the multi-cell connectivity configuration with the master cell (block 410). For example, the UE (such as by using receive processor 258, transmit processor 264, controller/processor 280, memory 282, or a combination thereof) may transmit, to a master cell associated with the UE and after release of a first secondary cell from a multi-cell connectivity configuration, an indication of a time gap for adding a second secondary cell to the multi-cell connectivity configuration with the master cell.

As shown in FIG. 4, in some aspects, the process 400 may include receiving, from the master cell and after the time gap, an indication to add the second secondary cell after release of the first secondary cell (block 420). For example, the UE (such as by using receive processor 258, transmit processor 264, controller/processor 280, memory 282, or a combination thereof) may receive, from the master cell and after the time gap, an indication to add the second secondary cell after release of the first secondary cell.

The process 400 may include additional aspects, such as any single aspect or any combination of aspects described below or in connection with one or more other processes described elsewhere herein.

In some aspects, transmitting the indication of the time gap includes transmitting the indication in a communication associated with the first secondary cell being added to the multi-cell connectivity configuration.

Although FIG. 4 shows example blocks of the process 400, in some aspects, the process 400 may include additional blocks, fewer blocks, different blocks, or differently arranged blocks than those depicted in FIG. 4. Additionally, or alternatively, two or more of the blocks of the process 400 may be performed in parallel.

Figure 5:
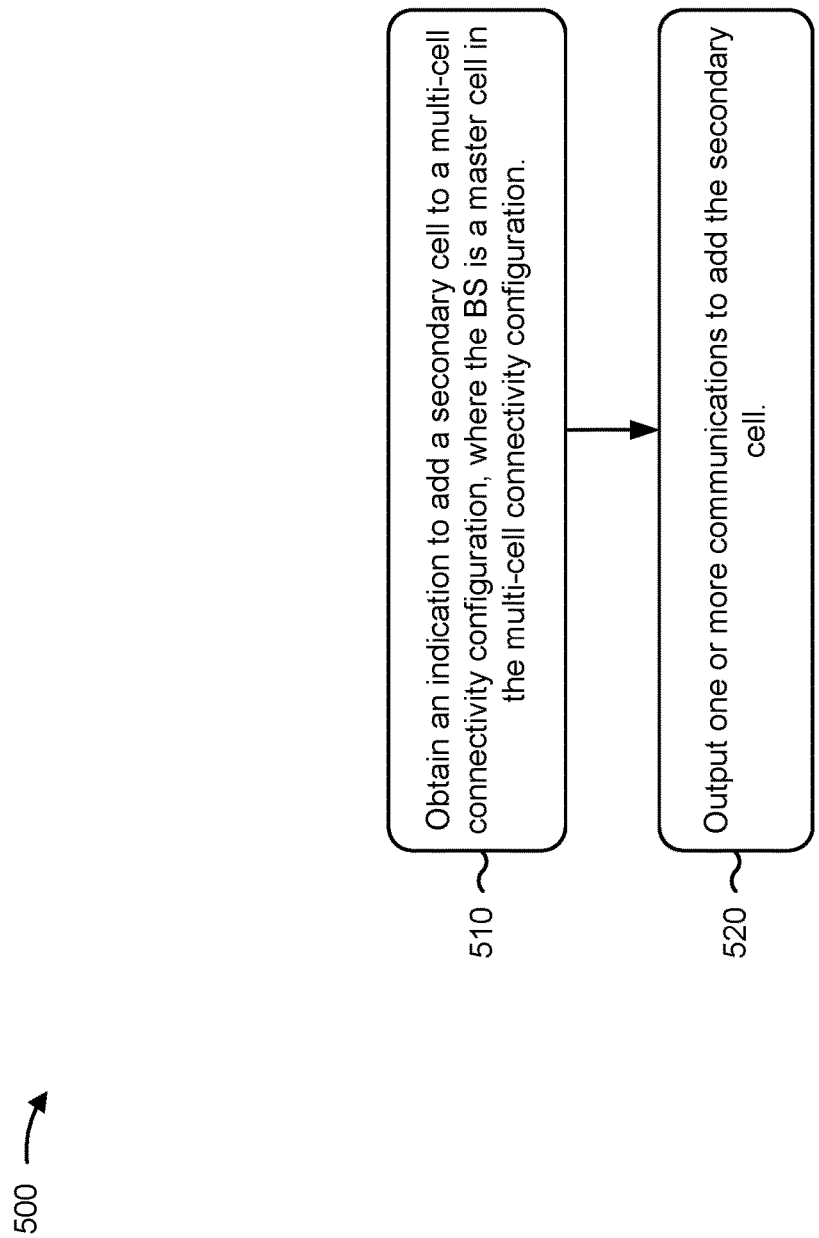
FIGS. 5 and 6 are diagrams illustrating example processes performed, for example, by a BS.

FIG. 5 is a diagram illustrating an example process 500 performed, for example, by a BS, in accordance with various aspects of the present disclosure. The example process 500 shows where the BS (for example, BS 110) performs operations associated with adding and releasing a secondary cell in a multi-cell connectivity configuration.

As shown in FIG. 5, in some aspects, the process 500 may include obtaining an indication to add a secondary cell to a multi-cell connectivity configuration, where the BS is a master cell in the multi-cell connectivity configuration (block 510). For example, the BS (such as by using transmit processor 220, receive processor 238, controller/processor 240, memory 242, or a combination thereof) may obtain an indication to add a secondary cell to a multi-cell connectivity configuration. In some aspects, the BS is a master cell in the multi-cell connectivity configuration.

As shown in FIG. 5, in some aspects, the process 500 may include outputting one or more communications to add the secondary cell (block 520). For example, the BS (such as by using transmit processor 220, receive processor 238, controller/processor 240, memory 242, or a combination thereof) may output one or more communications to add the secondary cell.

The process 500 may include additional aspects, such as any single aspect or any combination of aspects described below or in connection with one or more other processes described elsewhere herein.

In a first aspect, outputting the one or more communications to add the secondary cell includes outputting a first communication to release a measurement gap associated with the master cell. In a second aspect, alone or in combination with the first aspect, outputting the one or more communications to add the secondary cell includes outputting, after outputting the first communication, a second communication to add the secondary cell. In a third aspect, alone or in combination with one or more of the first or second aspects, outputting the one or more communications to add the secondary cell includes outputting a single communication to release a measurement gap associated with the master cell and add the secondary cell.

In a fourth aspect, alone or in combination with one or more of the first through third aspects, obtaining the indication includes obtaining the indication in at least one of a measurement report or a secondary cell group releasing complete communication. In a fifth aspect, alone or in combination with one or more of the first through fourth aspects, obtaining the indication includes obtaining the indication in at least one of an RRC setup request communication or an RRC setup complete communication. In a sixth aspect, alone or in combination with one or more of the first through fifth aspects, obtaining the indication includes obtaining the indication in at least one of an RRC resume request communication or an RRC resume complete. In a seventh aspect, alone or in combination with one or more of the first through sixth aspects, outputting the one or more communications to add the secondary cell includes outputting the one or more communications based at least in part on the indication.

Although FIG. 5 shows example blocks of the process 500, in some aspects, the process 500 may include additional blocks, fewer blocks, different blocks, or differently arranged blocks than those depicted in FIG. 5. Additionally, or alternatively, two or more of the blocks of the process 500 may be performed in parallel.

Figure 6:
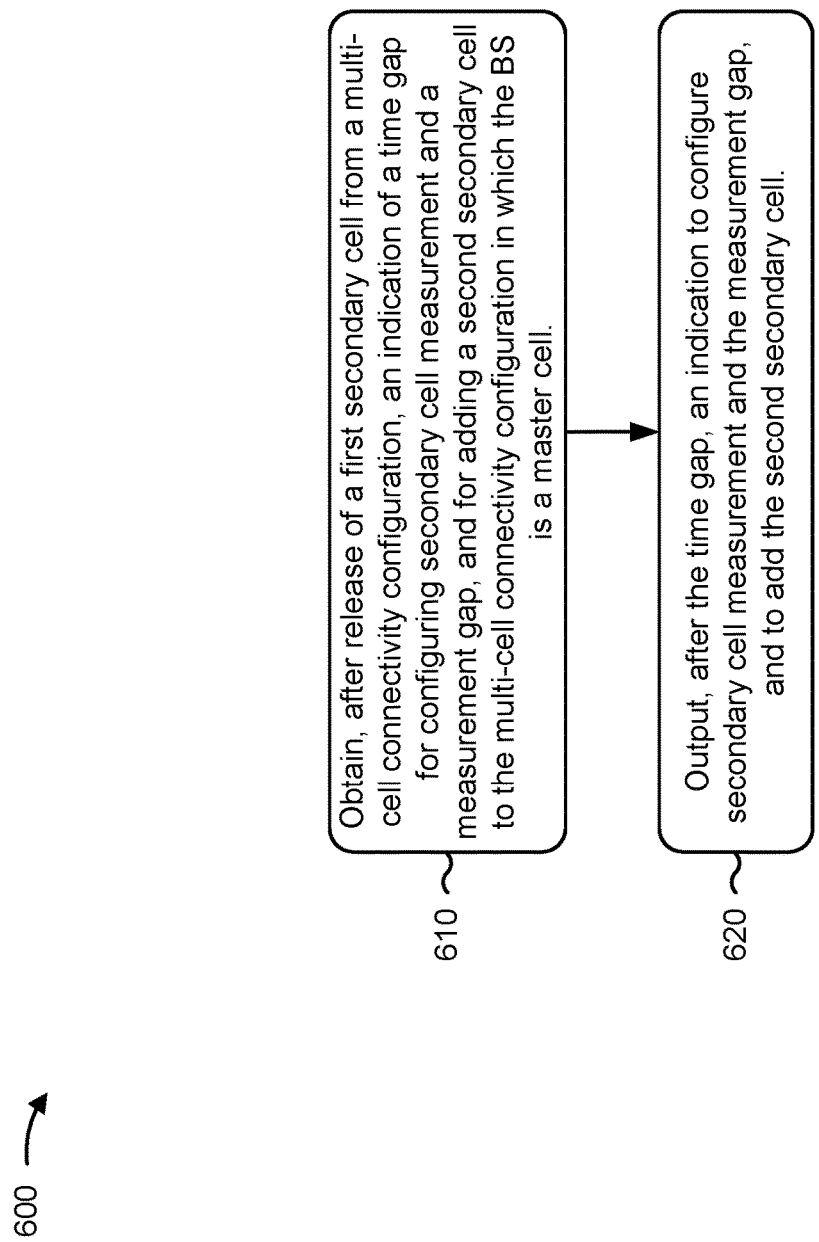

FIG. 6 is a diagram illustrating an example process 600 performed, for example, by a BS, in accordance with various aspects of the present disclosure. The example process 600 shows where the BS (for example, BS 110) performs operations associated with adding and releasing a secondary cell in a multi-cell connectivity configuration.

As shown in FIG. 6, in some aspects, the process 600 may include obtaining, after release of a first secondary cell from a multi-cell connectivity configuration, an indication of a time gap for configuring secondary cell measurement and a measurement time gap, and for adding a second secondary cell to the multi-cell connectivity configuration in which the BS is a master cell (block 610). For example, the BS (such as by using transmit processor 220, receive processor 238, controller/processor 240, memory 242, or a combination thereof) may obtain, after release of a first secondary cell from a multi-cell connectivity configuration, an indication of a time gap for configuring secondary cell measurement and a measurement time gap, and for adding a second secondary cell to the multi-cell connectivity configuration in which the BS is a master cell.

As shown in FIG. 6, in some aspects, the process 600 may include outputting, after the time gap, an indication to configure secondary cell measurement and the measurement gap, and to add the second secondary cell (block 620). For example, the BS (such as by using transmit processor 220, receive processor 238, controller/processor 240, memory 242, or a combination thereof) may output, after the time gap, an indication to configure secondary cell measurement and the measurement gap, and to add the second secondary cell.

The process 600 may include additional aspects, such as any single aspect or any combination of aspects described below or in connection with one or more other processes described elsewhere herein.

In some aspects, obtaining the indication of the time gap includes obtaining the indication in a communication associated with the first secondary cell being released from the multi-cell connectivity configuration.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

Figure 7:
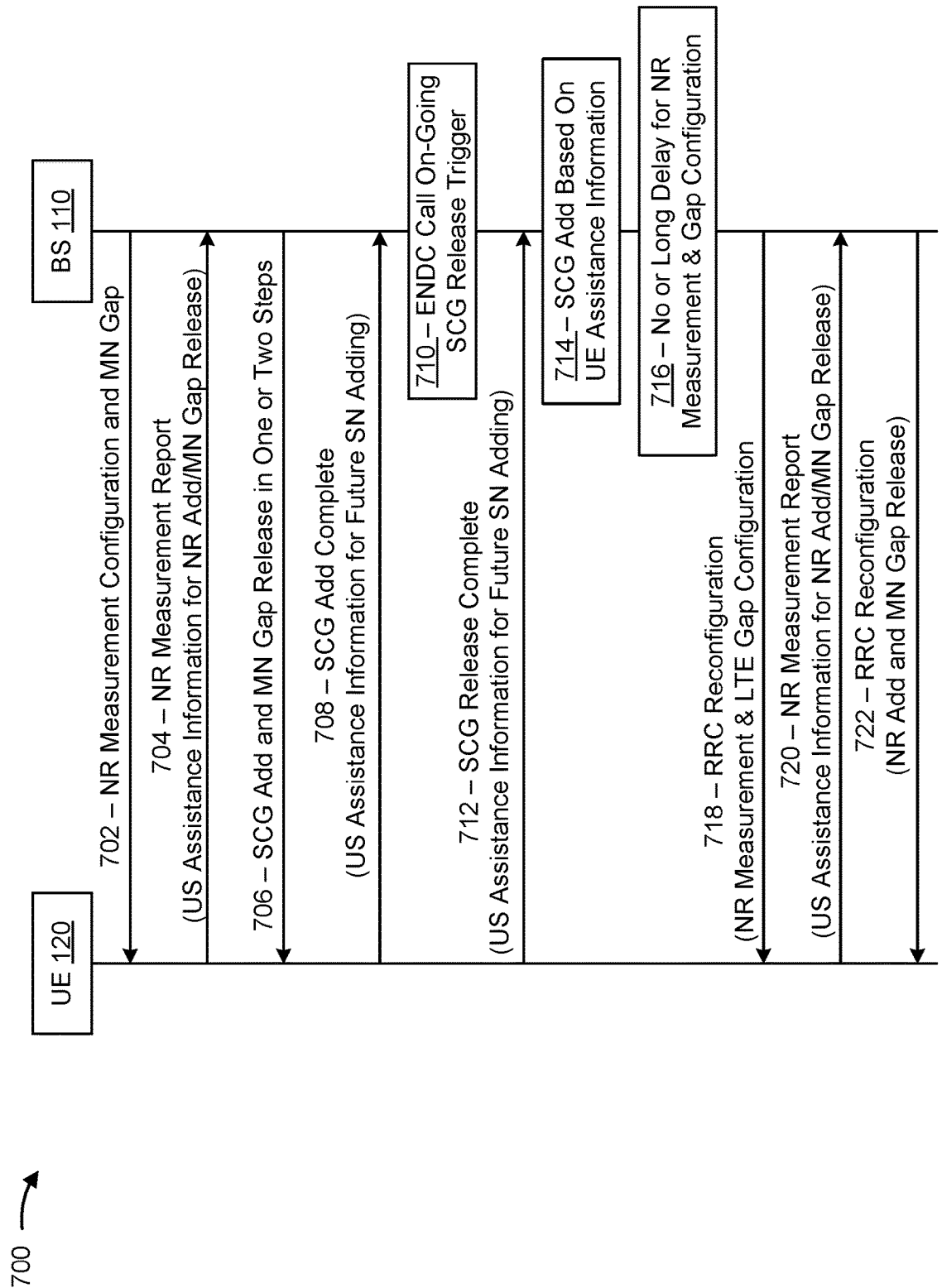
FIG. 7 is a diagram illustrating an example call flow between a UE and a BS.

FIG. 7 is a diagram illustrating an example call flow 700 between a UE 120 and a BS 110. The example call flow 700 may include one or more examples of adding and releasing a secondary cell in a multi-cell connectivity configuration in which the UE 120 is communicatively connected with a master cell (or master node) and one or more secondary cells (or secondary nodes). The BS 110 may operate as the master cell or the master node in the multi-cell connectivity configuration, and the secondary cell(s) may be implemented by other BSs 110. The UE 120 may transmit UE assistance information to the BS 110 to indicate a process that the BS 110 is to use to add a secondary cell to the multi-cell connectivity configuration, may indicate a time gap for adding a secondary cell after another secondary cell is released from the multi-cell connectivity configuration, as well as other multi-cell connectivity configuration information. The BS 110 identify a process, for adding a secondary cell to the multi-cell connectivity configuration, that is optimized for the UE 120's particular implementation, for the UE 120's battery consumption, or for the UE 120's traffic quality of service parameters, among other examples. This may increase throughput for the UE 120, may decrease communication latency for the UE 120, or may increase the battery life of the UE 120, among other examples. Moreover, the BS 110 may add a secondary cell to the multi-cell connectivity configuration after a time gap indicated by the UE assistance information, which may permit the BS 110 to manage the addition of new secondary cells more effectively.

As shown by reference number 702, the BS 110 may transmit, to the UE 120, an indication of an NR measurement configuration and an indication of a measurement gap for performing measurements of one or more candidate secondary cells. As described above in FIG. 2, the BS 110 may include a processing system and one or more interfaces. Accordingly, a first interface of the BS 110 (such as an interface between the processing system of a chip or a modem of the BS 110 and a receiver of the BS 110) may obtain a signal or information associated with the indication of the NR measurement configuration and the indication of the measurement gap. As described above in FIG. 2, the UE 120 may include a processing system and one or more interfaces. Accordingly, a first interface of the UE 120 (such as an interface between the processing system of a chip or a modem of the UE 120 and a receiver of the UE 120) may obtain a signal or information associated with the indication of the NR measurement configuration and the indication of the measurement gap.

As shown by reference number 704, the UE 120 may transmit, to the BS 110, an NR measurement report indicating one or more secondary cell measurements. The NR measurement report may include UE assistance information. A second interface of the UE 120 (such as an interface between the processing system of a chip or a modem of the UE 120 and a transmitter of the UE 120) may output a signal or information for transmission the NR measurement report. Additionally or alternatively, the UE 120 may transmit (and the BS 110 may receive) the UE assistance information in another type of communication, such as a measurement report, an RRC setup request communication, an RRC setup complete communication, an RRC resume request communication, an RRC resume complete, or a secondary cell group releasing complete communication, among other examples. A second interface of the BS 110 (such as an interface between the processing system of a chip or a modem of the BS 110 and a receiver of the BS 110) may obtain a signal or information associated with the NR measurement report.

In some aspects, the UE assistance information identifies a process for adding a secondary cell for a multi-cell connectivity configuration. The process may be a one-step process, in which the BS 110 instructs the UE 120 to release the secondary cell measurements and the measurement gap, and instructs the UE 120 to add a secondary cell, in a single communication. Additionally, or alternatively, the process may be a two-step process, in which the BS 110 instructs the UE 120 to release the secondary cell measurements and the measurement gap by transmitting a first communication to the UE 120, and instructs the UE 120 to add a secondary cell by transmitting a second communication to the UE 120.

As shown by reference number 706, the BS 110 may transmit, to the UE 120, an indication to release secondary cell measurements and a measurement gap, and to add a secondary cell for a multi-cell connectivity configuration. In some aspects, the BS 110 may use the process indicated in the UE assistance information, such as a one-step process or a two-step process. The first interface of the BS 110 may output a signal or information for transmission of the indication to release secondary cell measurements and the measurement gap, and to add a secondary cell for a multi-cell connectivity configuration. The first interface of the UE 120 may obtain a signal or information associated with the indication to release secondary cell measurements and the measurement gap, and to add a secondary cell for a multi-cell connectivity configuration.

As shown by reference number 708, the UE 120 may transmit, to the BS 110, a communication indicating that adding the secondary cell to the multi-cell connectivity configuration is complete. The communication may include or relate to a secondary cell group (SCG) adding complete communication. The UE 120 may include UE assistance information in the communication. The UE assistance information may identify a time gap for adding another secondary cell after release of the secondary cell from the multi-cell connectivity configuration. The second interface of the UE 120 may output a signal or information for transmission of the communication indicating that adding the secondary cell to the multi-cell connectivity configuration is complete. The second interface of the BS 110 may obtain a signal or information associated with the communication indicating that adding the secondary cell to the multi-cell connectivity configuration is complete.

As shown by reference number 710, while an Evolved Universal Mobile Telecommunications System (UMTS) Terrestrial Radio Access Network (E-UTRAN) NR dual connectivity (ENDC) call is on-going, the BS 110 may release the secondary cell from the multi-cell connectivity configuration. The processing system of the BS 110, the first interface, the second interface, or a combination thereof, may release the secondary cell from the multi-cell connectivity configuration.

As shown by reference number 712, the UE 120 may transmit, to the BS 110, a communication that indicates release of the secondary cell is complete. The communication may include an SCG releasing complete communication. The communication may include UE assistance information identifies a process for adding another secondary cell to the multi-cell connectivity configuration. The second interface of the UE 120 may output a signal or information for transmission of the communication that indicates release of the secondary cell is complete. The second interface of the BS 110 may obtain a signal or information associated with the communication that indicates release of the secondary cell is complete.

As shown by reference number 714, the BS 110 may initiate SCG adding for adding another secondary cell to the multi-cell connectivity configuration. The BS 110 may add another secondary cell based on the UE assistance information indicating the process for adding another secondary cell. As shown by reference number 716, the BS 110 may perform SCG adding to add the other secondary cell after the time gap indicated in the UE assistance information (for example, the time gap after the release of the secondary cell was complete). The processing system of the BS 110, the first interface, the second interface, or a combination thereof, may initiate SCG adding for adding another secondary cell to the multi-cell connectivity configuration.

As shown by reference number 718, the BS 110 may transmit, to the UE 120, an RRC reconfiguration communication that indicates an NR measurement and LTE measurement gap configuration for measuring one or more candidate secondary cells. The first interface of the BS 110 may output a signal or information for transmission of the RRC reconfiguration communication. The first interface of the UE 120 may obtain a signal or information associated with the RRC reconfiguration communication.

As shown by reference number 720, the UE 120 may transmit, to the BS 110, an NR measurement report identifying one or more secondary cell measurements. The NR measurement report may include UE assistance information. In some aspects, the UE assistance information identifies a process for adding a secondary cell to the multi-cell connectivity configuration. The second interface of the UE 120 may output a signal or information for transmission of the NR measurement report. The second interface of the BS 110 may obtain a signal or information associated with the NR measurement report.

As shown by reference number 722, the BS 110 may transmit, to the UE 120, an RRC reconfiguration communication to add a secondary cell to the multi-cell connectivity configuration and to release the secondary cell measurements and measurement gap. The first interface of the BS 110 may output a signal or information for transmission of the RRC reconfiguration communication. The first interface of the UE 120 may obtain a signal or information associated with the RRC reconfiguration communication.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed at an apparatus of a user equipment (UE), comprising:
   transmitting, to a master cell associated with the UE, an indication of a process for the master cell to follow to release secondary cell measurements from a multi-cell connectivity configuration with the master cell;
   receiving, from the master cell, one or more communications that include a communication to release the secondary cell measurements, the one or more communications being associated with adding a secondary cell; and
   transmitting, to the master cell, UE assistance information that identifies a time gap for adding another secondary cell after release of the secondary cell from the multi-cell connectivity configuration.

2. The method of claim 1, wherein receiving the one or more communications comprises:
receiving a first communication to release a measurement gap associated with the master cell.

3. The method of claim 2, wherein receiving the one or more communications further comprises:
receiving, a second communication, after receiving the first communication, to add the secondary cell.

4. The method of claim 1, wherein receiving the one or more communications comprises:
receiving a single communication to:
release a measurement gap associated with the master cell, and
add the secondary cell.

5. The method of claim 1, wherein transmitting the indication comprises:
transmitting the indication in at least one of:
a measurement report, including both normal and early measurement reporting, or
a secondary cell group releasing complete communication.

6. The method of claim 1, wherein transmitting the indication comprises:
transmitting the indication in at least one of:
a radio resource control (RRC) setup request communication, or
an RRC setup complete communication.

7. The method of claim 1, wherein transmitting the indication comprises:
transmitting the indication in at least one of:
a radio resource control (RRC) resume request communication, or
an RRC resume complete.

8. The method of claim 1, wherein the one or more communications are responsive to transmitting the indication.

9. A method of wireless communication performed at an apparatus of a base station (BS), comprising:
obtaining an indication of a process for a master cell to follow to release secondary cell measurements from a multi-cell connectivity configuration,
wherein the BS is the master cell in the multi-cell connectivity configuration;
outputting, for transmission, one or more communications that include a communication to release the secondary cell measurements, the one or more communications being associated with adding a secondary cell; and
obtaining UE assistance information that identifies a time gap for adding another secondary cell after release of the secondary cell from the multi-cell connectivity configuration.

10. The method of claim 9, wherein outputting the one or more communications comprises:
outputting, for transmission, a first communication to release a measurement gap associated with the master cell.

11. The method of claim 10, wherein outputting the one or more communications further comprises:
outputting, for transmission and after outputting the first communication, a second communication to add the secondary cell.

12. The method of claim 9, wherein outputting the one or more communications comprises:
outputting, for transmission, a single communication to:
release a measurement gap associated with the master cell, and
add the secondary cell.

13. The method of claim 9, wherein obtaining the indication comprises:
obtaining the indication in at least one of:
a measurement report, or
a secondary cell group releasing complete communication.

14. The method of claim 9, wherein obtaining the indication comprises:
obtaining the indication in at least one of:
a radio resource control (RRC) setup request communication, or
an RRC setup complete communication.

15. The method of claim 9, wherein obtaining the indication comprises:
obtaining the indication in at least one of:
a radio resource control (RRC) resume request communication, or
an RRC resume complete.

16. The method of claim 9, wherein outputting the one or more communications comprises:
outputting the one or more communications responsive to the indication.

17. An apparatus for wireless communication at a user equipment (UE), comprising:
a first interface configured to output an indication of a process for a master cell to follow to release secondary cell measurements from a multi-cell connectivity configuration with the master cell; and
the first interface or a second interface configured to obtain, from the master cell, one or more communications that include a communication to release the secondary cell measurements, the one or more communications being associated with adding a secondary cell,
wherein the first interface is further configured to output UE assistance information that identifies a time gap for adding another secondary cell after release of the secondary cell from the multi-cell connectivity configuration.

18. The apparatus of claim 17, wherein the first interface or the second interface, to obtain the one or more communications, is configured to:
obtain a first communication to release a measurement gap associated with the master cell; and
obtain a second communication, after obtaining the first communication, to add the secondary cell.

19. The apparatus of claim 17, wherein the first interface or the second interface, to obtain the one or more communications, is configured to:
obtain a single communication to:
release a measurement gap associated with the master cell, and
add the secondary cell.

20. The apparatus of claim 17, wherein the first interface, to output the indication, is configured to:
output the indication for transmission in at least one of:
a measurement report, including both normal and early measurement reporting, or
a secondary cell group releasing complete communication.

21. The apparatus of claim 17, wherein the first interface, to output the indication, is configured to:
output the indication for transmission in at least one of:
a radio resource control (RRC) setup request communication, or
an RRC setup complete communication.

22. The apparatus of claim 17, wherein the first interface, to output the indication, is configured to:
    output the indication for transmission in at least one of:
        a radio resource control (RRC) resume request communication, or
        an RRC resume complete.

23. The apparatus of claim 17, wherein the one or more communications are responsive to transmitting the indication.

24. An apparatus of a base station (B S) for wireless communication, comprising:
    a first interface configured to obtain an indication of a process for a master cell to follow to release secondary cell measurements from a multi-cell connectivity configuration,
        wherein the BS is the master cell in the multi-cell connectivity configuration; and
    the first interface or a second interface configured to output one or more communications that include a communication to release the secondary cell measurements, the one or more communications being associated with adding a secondary cell,
        wherein the first interface is further configured to obtain UE assistance information that identifies a time gap for adding another secondary cell after release of the secondary cell from the multi-cell connectivity configuration.

25. The apparatus of claim 24, wherein the first interface or the second interface, to output the one or more communications, is configured to:
    output a first communication to release a measurement gap associated with the master cell; and
    output and after outputting the first communication, a second communication to add the secondary cell.

26. The apparatus of claim 24, wherein the first interface or the second interface, to output the one or more communications, is configured to:
    output a single communication to:
        release a measurement gap associated with the master cell, and
        add the secondary cell.

27. The apparatus of claim 24, wherein the first interface, to obtain the indication, is configured to:
    obtain the indication in at least one of:
        a measurement report, or
        a secondary cell group releasing complete communication.

28. The apparatus of claim 24, wherein the first interface, to obtain the indication, is configured to:
    obtain the indication in at least one of:
        a radio resource control (RRC) setup request communication, or
        an RRC setup complete communication.

29. The apparatus of claim 24, wherein the first interface, to obtain the indication, is configured to:
    obtain the indication in at least one of:
        a radio resource control (RRC) resume request communication, or
        an RRC resume complete.

30. The apparatus of claim 24, wherein the first interface or the second interface, to output the one or more communications, is configured to:
    output the one or more communications responsive to the indication.

\* \* \* \* \*